June 18, 1957 C. B. GREEN 2,796,288
LATCH STRUCTURE FOR VEHICLE BODY DECK LIDS
Filed Oct. 12, 1954 2 Sheets-Sheet 1

INVENTOR.
CHARLES B. GREEN
BY
Wilson, Redrow, and Gaines
ATTORNEYS.

United States Patent Office 2,796,288
Patented June 18, 1957

2,796,288

LATCH STRUCTURE FOR VEHICLE BODY DECK LIDS

Charles B. Green, Detroit, Mich., assignor to Studebaker-Packard Corporation, a corporation of Michigan Application October 12, 1954, Serial No. 461,711

3 Claims. (Cl. 296—76)

The present application relates to latch and latch manipulator structure for closure members, particularly for deck lid or bonnet members and the like for automotive vehicles.

Conspicuous handles or manipulators for deck lid latches are less in evidence on automobiles now than formerly, and many current makes of domestic automotive vehicles having deck lids at the front or rear as appropriate employ purely key controlled latches having no latch operating handle as such. The simple twist key unlatching principle has excellent application theoretically to latches which are maintained in perfect adjustment and which are always kept properly lubricated. The stubborn practical cases of the stuck latch or a binding or unlubricated latch, however, present the disadvantage that the operating key therefor may be inadvertently twisted off or, a least, permanently deformed under some circumstances when it is the sole means afforded for forcing the stubborn latch to operate.

An object of the present invention is to provide a latch overcoming the foregoing disadvantages and more specifically is to provide a concealed or inconspicuous latch releasing handle for unlatching the latch.

Another object is the provision of a latch manipulator and a latching mechanism controlled thereby which have an interposed cam member engageable by the manipulator to release the latching mechanism for unlatching or opening movement. According to a feature of the invention the latch mechanism has a control member provided therefor which is so swingably mounted as to engage one side of the cam member and be deflected thereby laterally out of its normal path of motion when moving into retracted position and which engages another side of the cam member when occupying such retracted position so as to be positively held thereby against motion due to its engagement with the cam member until the latter is actuated out of such normal path of motion by means of the latch manipulator.

A further object is to provide an interlatching deck lid and body compartment structure which cooperatively defines a license plate receiving recess of which the upper side is formed by a hollow overhanging ledge on the deck lid. According to a feature of the invention the hollow over-hanging ledge on the lid has fixed and movable walls vertically spaced apart from one another, the lower movable wall of which has the combined function of forming the top or upper side of the license plate recess in its one undepressed position and being depressible therefrom to another position to function as the externally operated latch manipulator. According to a further feature of the invention, the lower movable wall in its one undepressed position serves to close off and hide from view and from exposure the interior surface of the hollow ledge which is normally adapted to house at least a portion of a lid latching structure.

Another object of the invention is to provide within a closure member having an external multipart molding, a closure latch having a combined latch manipulator and molding part member which, in one function, normally blends flush with and completes the continuity of the molding but which in another function is manually depressible below the surface of the latter to an operating position to cause release of the latch.

Further features, objects and advantages will either be specifically pointed out or become apparent when for a better understanding of the invention, reference is made to the following written description taken in conjunction with the accompanying drawings, in which.

Figure 1:
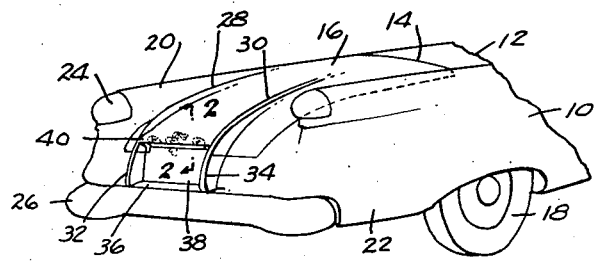
Figure 1 is a view in perspective showing the latching invention applied to the rear deck lid of a vehicle.
Figure 2:
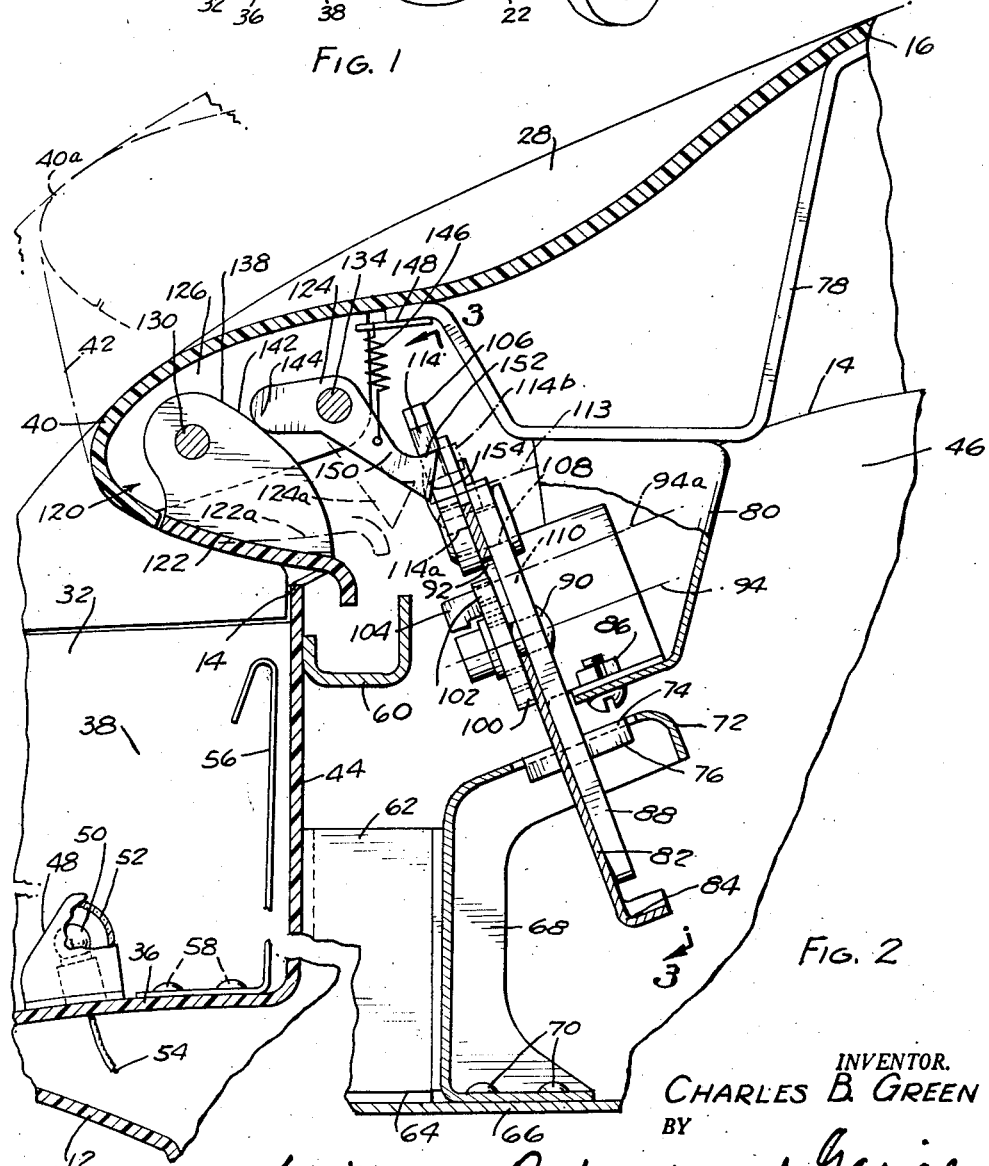
Figure 2 is a transverse sectional view of the lid and latch taken along the section lines 2—2 of Figure 1.

In the drawings, a vehicle 10 is shown having a body 12 provided with a four-sided well or rear deck opening 14 and further provided with a closable rear deck lid 16 therefor adapted to swing upwardly to open the opening 14 about a substantially horizontally extending swing axis in the vicinity of the front edge of the lid 16. In well known manner, a conventional hinge means may be provided in the body 12 for defining a prescribed path of such upward swinging movement and preferably the hinge means is spring urged toward upward opening movement at all times. The vehicle 10 may be a conventional passenger automobile or else a sports car if desirable and having four-ground-engaging wheels of which the right rear wheel is illustrated at 18 and further having a pair of laterally spaced apart left and right rear fenders 20, 22. Each of the rear fenders 20, 22 incorporates a combined tail and stop lamp assembly as at 24 in the upper rear end portion thereof. A wrap around type bumper bridges across the lower portion of the after body of the vehicle 10 and extends partially around the lower rear portions of the rear fenders 20, 22. The physical material of the body 12 may be fiber glass-reinforced platic or resins, or the like, and this so-called Fiberglas body 12 has the after part thereof molded so as to incorporate a laterally spaced apart pair of up-raised longitudinal ribs having their main portions 28, 30 formed integrally in the movable lid structure 16 and having a pair of respective rear extension or continuation portions 32, 34 divided from the main portions along the separating line between the deck opening 14 and the lid 16, such continuation portions forming integral stationary body parts. The continuation portions 32, 34 at their lower ends combine with a horizontally extending flat shelf portion 36 of the body adjacent the bumper 26 to define three sides of a stationary license plate recess 38 which, when the lid 16 is closed, is bounded along its upper side by a horizontally overhanging hollow molding or ledge 40 on the lid bridging laterally between and smoothly blending integrally into the lower or after ends of the main rib portions 28, 30 of the spaced apart body ribs. When the deck lid 16 is swung upwardly due to the bias of the noted hinge springs, not shown, the rear ledge 40 moves in the prescribed path along an arc indicated at 42 from the solid line position shown by the solid lines in Figure 2 into a progression of open positions one of which is illustrated, for instance, by the dotted line showing 40a of Figure 2.

The opposite lateral sides of the license plate recess 38 are formed by the left and right rib continuation portions 32, 34 and at the rear thereof, the license plate receiving recess 38 is provided with an integral body wall 44 separating the same from an upwardly open deck lid compartment for the storage of luggage and other articles at 46 and terminating in the previously noted upper edge 14. A license plate illuminating lamp housing 48 may be secured to the lower side 36 of the license plate recess and is adapted to contain a bulb 50 which shines through a lens 52 to illuminate the license plate recess when energized through a battery connected wire as at 54. A license plate mounting bracket 56 may be similarly secured to the lower side 36 of the recess as by means of a pair of spaced apart screws or rivets 58.

On the inner or luggage compartment side thereof, the wall 44 on the closed side of the license plate recess 38 has an upwardly open U shaped reinforcing gutter 60 adjacent the upper edge thereof which extends transversely of the compartment 46. At the lower or base end of the inner side of the wall 44 there is provided an upstanding spacer bracket 62 which through a base 64 formed thereon is secured to the rear deck portion of a vehicle floor pan 66 at the bottom of the luggage compartment 46. Adjacent and secured to the spacer bracket 62, an angular keeper bracket 68 is provided having a foot which is secured to the rear deck pan 66 as by means of a plurality of rivets 70. The keeper bracket 68 has a cantilever keeper portion 72 at its upper end which is angularly related to the vertically upstanding body portion thereof at an angle of approximately 20°. Centrally thereof, the keeper portion 72 has a latch receiving opening 74 formed therein and bounded at the opposite lateral sides by two diametrically opposed depending flanges 76.

An angular supporting bracket 78 is mounted to the under side of the deck lid 16 as by means of a plurality of rivets, not shown, and is welded to and supports a latch mounting bracket 80 to which a stationary latch plate 82 is mounted having a stationary depending pilot portion 84 which during closing movement of the lid 16 pilots the latch into the keeper opening 74 bounded by the depending keeper flanges 76. One or more screw and nut fasteners 86 removably attach together the stationary latch plate 82 and the latch mounting bracket 80. A keeper engaging swinging finger or tongue 88 for the latch has a central portion which carries a transversely disposed rivet 90 rigidly therewith which protrudes through a vertically disposed slot 92 formed in the stationary latch plate 82 and normally defining a swing axis as at 94 about which the keeper-engaging latching finger swings along a normal arc of tilt as at 96 from the solid line position shown by the solid lines 88 to a dotted line position shown by the dotted lines at 88a. The normal or pure tilting motion just noted in connection with the latch 88 between its solid line position shown in Figure 2 and its dotted line position 88a is accomplished during movement of separation between the deck lid 16 and the luggage compartment 46, being occasioned by reason of a wiping movement occurring between a ramp surface 98 formed on the keeper engaging finger 88 and the adjacent keeper flange 76 engaged thereby.

Figure 3:
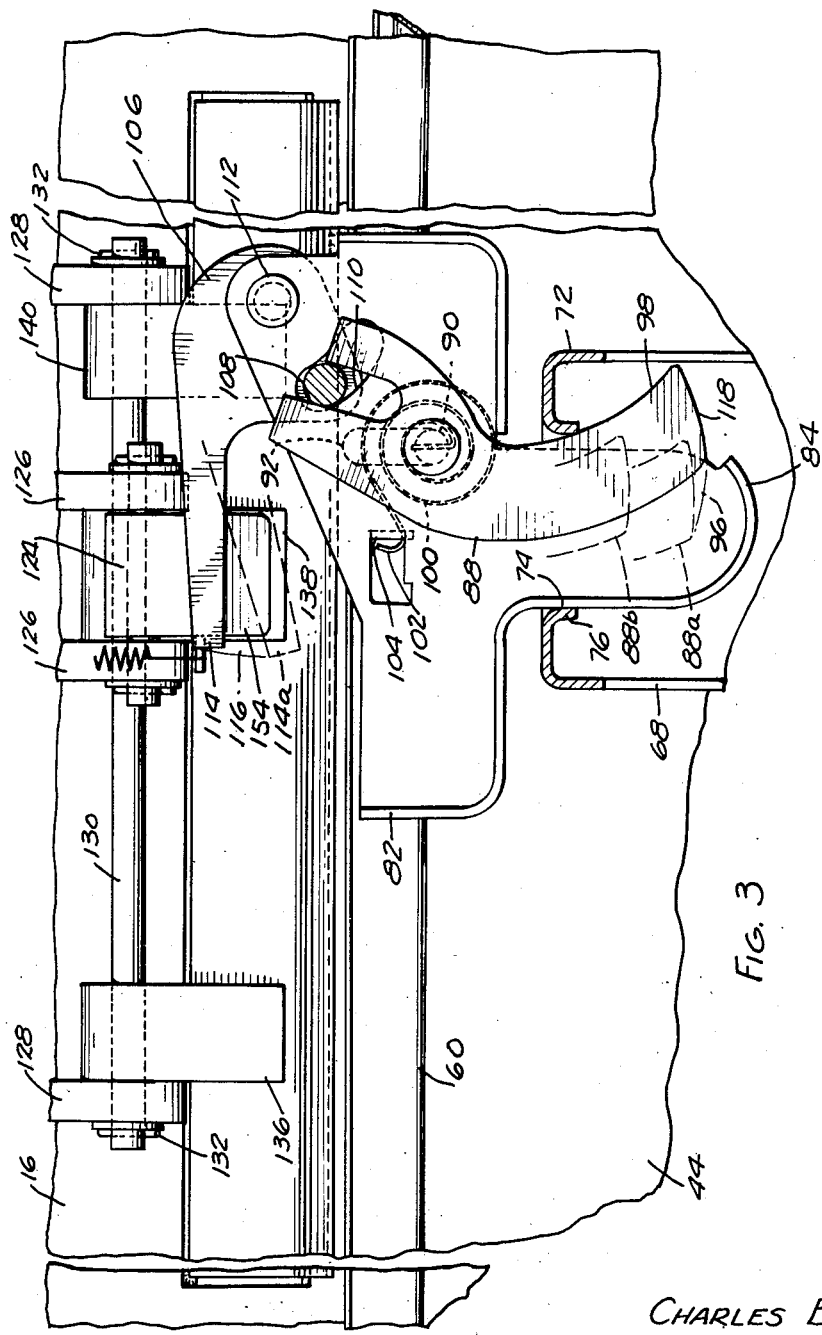
Figure 3 is a face view in section of the latch along the lines 3—3 of Figure 2.

A spirally coiled latch return spring 100 has its inner end received in a slot formed in the protruding end of the stud 90 which is rotatably fast to and rigid with the latch finger 88. The outer end of the coil spring 100 terminates in a reversely bent half loop 102 which is anchored upon a fixed bracket 104 secured to the fixed latch plate 82 as by means of welding. The coil spring 100 is pre-wound under torsion to urge at all times the finger stud 90 into a downward position at the bottom of the fixed vertical slot 92 and also to urge the finger 88 into the solid line or counter-clockwise-most position shown in Figure 3. The spring opposed tilting movement of the latch finger 88 along the arc 96 is accompanied by the companion movement of oscillation of a latch control member 106 disposed on the opposite side of the plate 82 from the latch finger 88 but connected thereto by means of a pin and slot connection generally indicated at 108. The slot of the pin and slot connection 108 is formed in an upper end portion of the tilting finger 88 and the pin of the resulting connection consists of a pin integral with a lower portion of the latch control member 106 and protruding therefrom through an arcuate slot 110 from one side of the fixed plate 82 to the other and formed in the latter. The arcuate slot 110 has a reference center defined by a rivet 112 which forms a pivot between the latch control member 106 and the fixed latch plate 82 so as to provide for swinging movement of the latch control member about a fixed axis 113 through the rivet. The latch control member 106 has a laterally flexible extended finger portion 114 movable along an arc generally indicated at 116 from the solid line position shown in Figure 3 into a dotted line position shown by the dotted lines 114a during the time at which the latch finger 88 undergoes a coordinated tilting movement along the arc 96.

All movement of the latch finger 88 is not necessarily attended by corresponding movement of the latch control member 106. Let it be assumed that the latch control member 106 is held stationary in the solid line position of Figure 3. During downward movement of approach of the deck lid 16 from a separated position with respect to the luggage compartment 46, the finger 88 presents an active keeper engaging portion 118 which engages the keeper adjacent the mouth of the opening 74 therein and which, against the opposition of the coil spring 100, causes a composite relative movement of the finger 88 with respect to the fixed plate 82 into an upper twisted and shifted dotted line position in the slot 92 with a resulting combined bodily shifted and tilting movement into a position as indicated at 88b in dotted lines in Figure 3. The actual path of bodily shifting movement of the finger 88 with respect to the slot 92 is controlled by the pin and slot connection effective between the slot 92 and the pin 90 slidable therein, whereas the tilting phase of the combined shifting and tilting movement is brought about by the relative oblique or bias angularity of the pin and slot connection 108 between the tilting finger 88 and the above assumed temporarily stationary latch control member 106. That is to say, the disposition or the angularity of the slot in the pin and slot connection 108 and the angularity of the slot 92 with respect thereto are such that the relative paths of travel of the slots and the pins therein form intersecting angles so as to be productive of tilting movement of the finger 88 when shifting upwardly and downwardly with respect to the stationary control member 106.

Means is provided to control the latch from a point external to a recessed chamber or compartment 120 defined by the hollow interior of the ledge 40 of the deck lid which will be seen to overhang the luggage compartment 46 to the rear thereof.

Illustrative of one example of such control means is a control release plate member 122 forming the upper side of the license plate recess 38 and a double ended cam member 124 disposed within the chamber 120 and operatively connected to the control releasing plate 122. For the purpose of swingably mounting the members 122 and 124, the ledge 40 incorporates a medial pair of spaced apart hinge pin supports as at 126 and a lateral pair of hinge pin supports 128, the latter of which straddle the former and all of which are transversely aligned with one another to receive a hinge pin 130 passing through registering apertures therethrough. The hinge pin 130 has retainers as at 132 at its opposite ends engaging the outer surfaces of the lateral pair of straddling supports 128; the medial pair of hinge pin supports 126 has a forwardly offset pair of additional apertures therethrough in which another hinge pin 134 is received for pivotally mounting a central or mid-portion of the double ended cam member 124 thereupon.

The latch release plate 122 has a plurality of transversely aligned hinge lugs, preferably three in number as at 136, 138 and 140, of which the middle hinge lug 138 presents a cam surface 142 which engages a semi-circular cam nose portion formed on one of the ends of the double-ended cam member 124. A cam member return spring 146 is anchored at one end to an anchoring bracket 148 secured to the support bracket 78 and at its opposite end is hooked into an opening formed in a corresponding end portion 150 on the cam member 124. The just noted latter end portion 150 of the cam member 124 has one side thereof as formed at 152 which engages the outermost end of the flexible extended finger portion 114 of the latch control member 106 in a restrained position preventing oscillatory movement of the control member 106. An adjacent adjoining side 154 of the noted cam member portion 150 has a ramp formation which also is engageable with the flexible latch control finger 114 but only when the latch control finger 114 is moved in a direction along the arc 116 from the dotted line position shown by the dotted lines 114a in Figures 2 and 3 toward the solid line restrained position. Infrequently, the latch mechanism may be so operated that the cam member 124 occupies the solid line position of Figure 2 at a time when the latch control finger 114 is trying to traverse such path and direction of motion of return from the dotted line position shown at 114a to the solid line position 114 shown in Figure 2. The flexible finger 114 therefore will, under the indirect force of the coil spring 109, encounter the ramp surface 154 and be wedged and deflected laterally out of its normal path of movement along the arc 116 prior to its ultimate destination to the restored position shown in solid lines in Figure 2. Ordinarily, however, during the periods at which the control finger 114 is being moved into its restored position, the cam member 124 has a position indicated by the dotted lines shown at 124a in Figure 2 produced due to the cam engagement of the cam surface 142 therewith caused when the control release plate 122 is manually depressed into the dotted line position shown by the dotted lines 122a in Figure 2. In its undepressed solid line position shown in Figure 2, the control release plate 122 encloses and hides from view the interior 126 of the hollow ledge 140. Under such circumstances, the deck lid 16 may be slammed downwardly into place to close the luggage compartment 46 without the necessity of any resulting motion of the control release plate 122, of the cam member 124, or of the latch control member 106. At such times the keeper-engaging finger 88 merely undergoes a combined tilting and bodily shiftable movement into the position 88b previously noted which permits the protruding tip of the finger 88 formed by the intersecting surfaces 98, 118 thereof to clear the inner margins of the keeper opening 74. It will be appreciated that the inconspicuous and substantially concealed control release plate 122 is barely perceptible to the eye on a horizontal level with the license plate recess 38 and when viewed from a relatively low level still serves to provide a substantially unbroken surface to the molding 40 in the vicinity of the license plate recess. The control release plate 122 is preferably formed on the same material as the body 12 and the lid 16, namely, fiber glass reinforced plastic, or thermo setting resin.

As herein disclosed the invention is shown embodied in a spring loaded deck lid having a release-type latch requiring more than bare latching releasing actuation if it is to be unlatched, to wit, a latch releasing actuation followed by a latch separating movement conveniently induced by means of a set of preloaded lid hinge springs which, for example, may be provided. It is evident that the advantages of the invention are to be realized in a different type of latch of known construction which, when actuated, unlatches to disengage itself without the necessity of any separating movement of the lid. So also the drawings show a latch mechanism from which all showing of a key controlled lock therefor is omitted, but self-evidently any one of various commercial key controlled lock cylinders can be visualized in their application to the present latch mechanism. The latch mechanism and concealed latch manipulator therefor are shown herein incorporated in a rear deck compartment cover but indeed it is not essential that the invention be limited to rear deck use and the adaptation of the concealed latch manipulator and associated structure to a front compartment cover may be effected vary advantageously.

Variations within the spirit and scope of the invention disclosed are equally comprehended by the foregoing description.

What is claimed is:

1. A deck lid and latch mechanism for vehicle bodies having a compartment for storing articles with an external opening which is uncovered by pivoting one end of the deck lid upwardly, comprising a ledge portion formed near said one end of the deck lid adapted to overhang the corresponding edge of the compartment, said ledge portion having a downwardly facing substantially horizontal wall forming the upper side of a license plate recess and serving as a latch release plate for the latch mechanism, means for mounting said wall for pivotal movement in an upward direction, latch control means responsive to the upward pivotal movement of the wall for releasing the latch mechanism, whereby the latter may be released and the deck lid raised by a manually applied upward force on the wall.

2. A device as described in claim 1, wherein said latch mechanism includes a stationary bracket in said compartment, a finger member pivotally connected to the deck lid and adapted to be releasably engaged with the stationary bracket to hold the deck lid closed, said finger member also being mounted for a bodily shifting movement in the plane described by its pivotal movement, resilient means for urging said finger member toward its engaged position with respect to said bracket, control means including a pivotally mounted control member connecting with said deck lid for obstructing the releasing movement of the finger member, said control means and control member being responsive to the pivotal movement of the wall to permit the finger member to be pivoted to its release position, whereby the finger member may be moved with the deck lid and pivoted simultaneously as the deck lid is operated and the finger member engages the stationary bracket.

3. A deck lid and latch mechanism for vehicle bodies and the like having a compartment for storing articles with an external opening which is uncovered by pivoting one end of the deck lid upwardly, comprising a hollow protruding ledge portion formed near said one end of the deck lid, said ledge portion having a downwardly facing horizontal wall forming the topside of a license plate recess, said horizontal wall also serving as a latch release plate for the latching mechanism, means for mounting said wall for pivotal movement in an upward direction, a stationary bracket mounted within the compartment near said one end of the deck lid, a finger member pivotally connected with the ledge portion of the deck lid for engaging and releasing movement with respect to the bracket, said finger member also being mounted for limited bodily shifting movement when the latter comes in contact with the bracket as the deck lid is closed, resilient means urging the finger member toward its engaged position, pivotally mounted control member to pivot the finger member toward its engaging and releasing positions, a cam member to obstruct the releasing movement of the control member, and means responsive to the pivotal movement of the wall to move the cam member to a position whereby the control member and finger member may be moved toward their releasing position.

References Cited in the file of this patent

UNITED STATES PATENTS

| | | |
|---|---|---|
| 1,256,992 | Edgar | Feb. 19, 1918 |
| 2,017,954 | Draa | Oct. 22, 1935 |
| 2,104,539 | Hacker | Jan. 4, 1938 |
| 2,640,723 | Lauer | June 2, 1953 |
| 2,658,778 | Dall | Nov. 10, 1953 |
| 2,700,885 | Dall | Feb. 1, 1955 |